(12) United States Patent
Martin

(10) Patent No.: US 7,451,660 B2
(45) Date of Patent: Nov. 18, 2008

(54) POST CALIBRATION CATALYTIC CONVERTER CANNING APPARATUS AND METHOD

(75) Inventor: Scott M. Martin, Albion, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 520 days.

(21) Appl. No.: 11/331,443

(22) Filed: Jan. 12, 2006

(65) Prior Publication Data

US 2006/0150382 A1    Jul. 13, 2006

Related U.S. Application Data

(60) Provisional application No. 60/643,357, filed on Jan. 12, 2005.

(51) Int. Cl.
*G01N 3/08* (2006.01)
(52) U.S. Cl. ............................................ 73/819; 73/818
(58) Field of Classification Search .................. 73/760, 73/818, 819
See application file for complete search history.

(56) References Cited

U.S. PATENT DOCUMENTS

| | | | |
|---|---|---|---|
| 4,706,507 A | | 11/1987 | D'Angelo |
| 4,969,264 A | | 11/1990 | Dryer et al. |
| 5,118,476 A | | 6/1992 | Dryer et al. |
| 5,724,735 A | | 3/1998 | Ickes et al. |
| 6,101,714 A | * | 8/2000 | Schmitt ........................ 29/890 |
| 6,497,430 B1 | * | 12/2002 | Odom et al. ................. 280/735 |
| 6,520,834 B1 | * | 2/2003 | Marshall ........................ 451/5 |
| 6,954,988 B2 | * | 10/2005 | Mayfield ...................... 29/890 |
| 7,159,471 B2 | * | 1/2007 | Fortune et al. ................ 73/780 |
| 2004/0013582 A1 | * | 1/2004 | Ichikawa et al. ............ 422/180 |
| 2007/0212269 A1 | * | 9/2007 | Kobayashi et al. .......... 422/168 |

* cited by examiner

*Primary Examiner*—Max Noori
(74) *Attorney, Agent, or Firm*—Harness, Dickey & Pierce, P.L.C.

(57) ABSTRACT

A method and apparatus for assembling an exhaust treatment device such as a catalytic converter employs post calibration to achieve a desired bulk gap density of a support mat surrounding a substrate in the device housing. The mat is gauged under pressure to a thickness yielding the target bulk gap density and the pressure is saved for use in comprising the device housing against the mat after soft stuffing of the mat/substrate subassembly into the housing.

3 Claims, 3 Drawing Sheets

US 7,451,660 B2

POST CALIBRATION CATALYTIC CONVERTER CANNING APPARATUS AND METHOD

CROSS-REFERENCE TO RELATED APPLICATION

This application claims the benefit of U.S. Provisional Application No. 60/643,357, filed Jan. 12, 2005.

BACKGROUND OF THE INVENTION

The invention relates to assembly of a catalytic converter having a catalyst substrate surrounded by a support mat housed within an outer shell. More specifically, the invention pertains to post calibration converter canning enabling confirmed integrity of gap bulk density throughout the life of the converter.

One known type of catalytic converter for automotive exhaust applications is shown in FIG. 6. Catalytic converter 1 comprises an open ended, tubular sheet metal body 3, the inside of which defines a chamber 5 for a ceramic monolith, honeycomb-type, catalyst substrate 7 having flat ends 9 and a great number of catalyst coated, longitudinal honeycombed cell passages 11 extending from one end to the other. The central portion of the substrate 7 is surrounded by an annular, shock absorbent, resilient, insulative support mat 13, which is preferably fashioned from a gas impervious vermiculite based material that expands substantially upon heating. Mat 13 is compressed at assembly to about one half of its initial thickness. The opposite end portions 15 of the body 3 are preferably each formed or swaged to a partially spherical shape as illustrated having central openings substantially less in diameter than the diameter of substrate 7. Gas flow end bushings 17 and 19 have tubular outer ends 21 and 23, respectively, for attachment by welding or clamping or otherwise to the exhaust system conduits (not shown). Bushings 17 and 19 also have outwardly flared annular partially spherical inner end flanges 25 and 27, respectively, each of which is preferably formed on a radius corresponding to that of the body end portions 15 to which they are welded in selected locations so that their ends 21 and 23 have the desired orientation with respect to the center line or axis of body 3.

Known assembly methods using pre-calibration have potential for shear damage to the support mat and/or the converter substrate during stuffing into the outer shell of the converter. Hence, there is a need for a process and arrangement for stuffing a mat/substrate sub-assembly into a converter shell and then to size the converter can to a predetermined diameter to achieve a desired gap bulk density of the support mat without the stuffing damage incurred with prior art approaches.

SUMMARY OF THE INVENTION

Accordingly, a catalytic converter is fabricated by first taking a catalytic substrate and wrapping a support mat around it to form a sub-assembly. The sub-assembly is then placed in a gauging station which compresses the support mat about the substrate and the mat is gauged to determine a thickness which will yield a desired gap bulk density when the converter is finally assembled. The pressure applied to achieve this desired gap bulk density is then stored for future use. Next, the sub-assembly is soft stuffed into a converter can and passed on to a sizer station where the outer can is uniformly compressed radially inwardly under a pressure which was determined at the gauging station in the prior step. The pressure determined at the gauging station is adjusted to take outer shell spring-back into account.

In another aspect of the invention, pressure is applied to a sub-assembly comprising a catalytic substrate surrounded by a support mat wherein a plurality of interface pads radially direct pressure against the sub-assembly and this pressure is measured by a like plurality of load cells respectively associated with each interface pad. The support mat is gauged to determine its thickness at a pressure being applied and the pressure is adjusted until the mat reaches a predetermined thickness which will yield a desired gap bulk density. Each interface pad/load cell pair of the plurality has the interface pad coupled to a support frame via a leaf spring to stabilize the load cell/interface pad combination. Additionally, a coil spring couples the load cell to its corresponding interface pad to provide further stabilization of the assembly.

BRIEF DESCRIPTION OF THE DRAWING

The objects and features of the invention will become apparent from a reading of a detailed description taken in conjunction with the drawing, in which.

DETAILED DESCRIPTION

Figure 1:
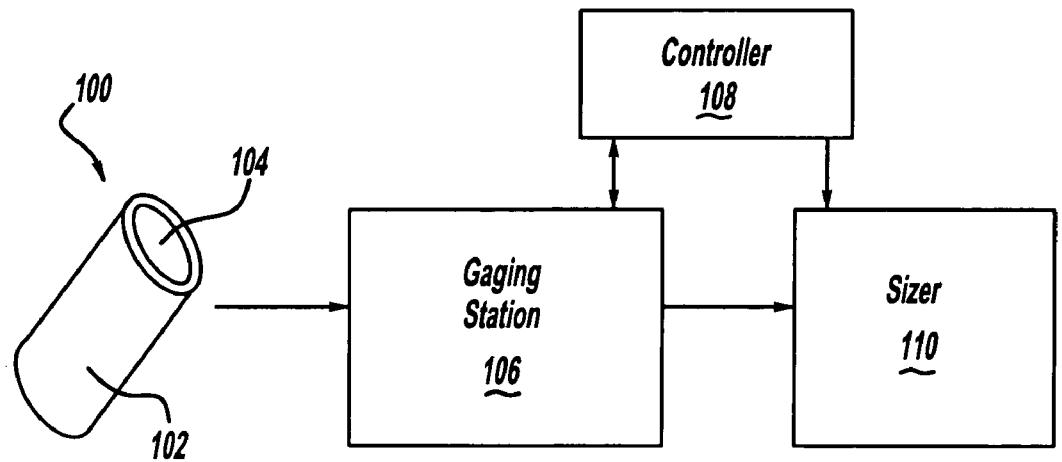
FIG. 1 is a schematic block diagram of converter assembly apparatus arranged in accordance with the principles of the invention.

With reference to FIG. 1, a sub-assembly 100 comprising a support mat 102 surrounding a catalytic substrate 104 is temporarily assembled using, for example, masking tape. Sub-assembly 100 is then inserted into a nest which transfers the sub-assembly 100 into a gauge station 106. The gauge station 106 then compresses the sub-assembly 102 to an average pressure which will yield a predetermined desired gap bulk density for the support mat. One typical converter could, for example, have a target pressure of 40 psi which correlates via experimental data to a gap bulk density of 0.83 grams per cubic centimeter. Based on the theory of 0.83 grams per cubic centimeter, gap bulk density and the achieved displacement value of gauge compression, the achieved mat gap is then correlated to a larger mat gap and a corresponding gap bulk density value, such as 0.953 grams per cubic centimeter. The pressure utilized to achieve the gauged mat width is then saved, for example, in controller 108 for use in a sizer station 110. Feedback from the gauging 106 is transferred to the sizer for use in final assembly of sub-assembly 100 within an outer shell or can 202.

Figure 2:
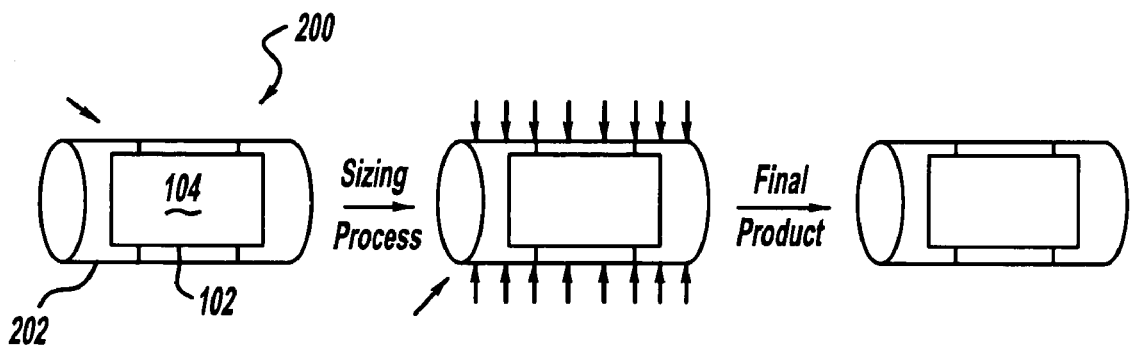
FIG. 2 depicts various stages of the method used in assembling a converter in accordance with the principles of the invention.

After undergoing gauging, the sub-assembly 100 is "soft stuffed" in converter outer shell or can 202 and then, as seen in FIG. 2 is transferred to the sizer for uniformly radially directed inward pressure about the support mat to house the sub-assembly 100 within can 202. The pressure used at the sizer is derived from the gauging process and yields the final product minus the end caps typically utilized.

Figure 3:
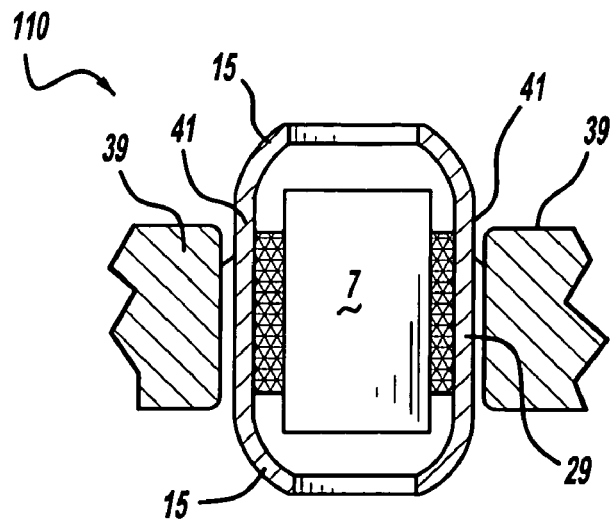
FIG. 3 sets forth pertinent details of a sizing station useful in accordance with the principles of the invention.

One type of sizer equipment is taught in U.S. Pat. No. 5,118,476 which is hereby incorporated by reference. One of the figures of the '476 patent is set forth in FIG. 3 hereof. As seen from FIG. 3, two or more compression dies 39 each having a circular forming surface 41 are positioned about and simultaneously driven radially inwardly about the central portion 29 of the converter tube 15 thereby resulting in the tube wall being uniformly radially deformed and driven into compressing contact with support mat 13. The axial width of each forming surface 41 is selected to be substantially coextensive with that of the mat. As discussed previously, the pressure applied to compression dies 39 is determined from the previous gauging process.

Gauging station 106 of FIG. 1 can utilize a number of conventional gauging techniques for determining the desired support mat width under compression. These techniques include laser measurement, mass measurements of the support mat or shadow measurement.

Figure 4:
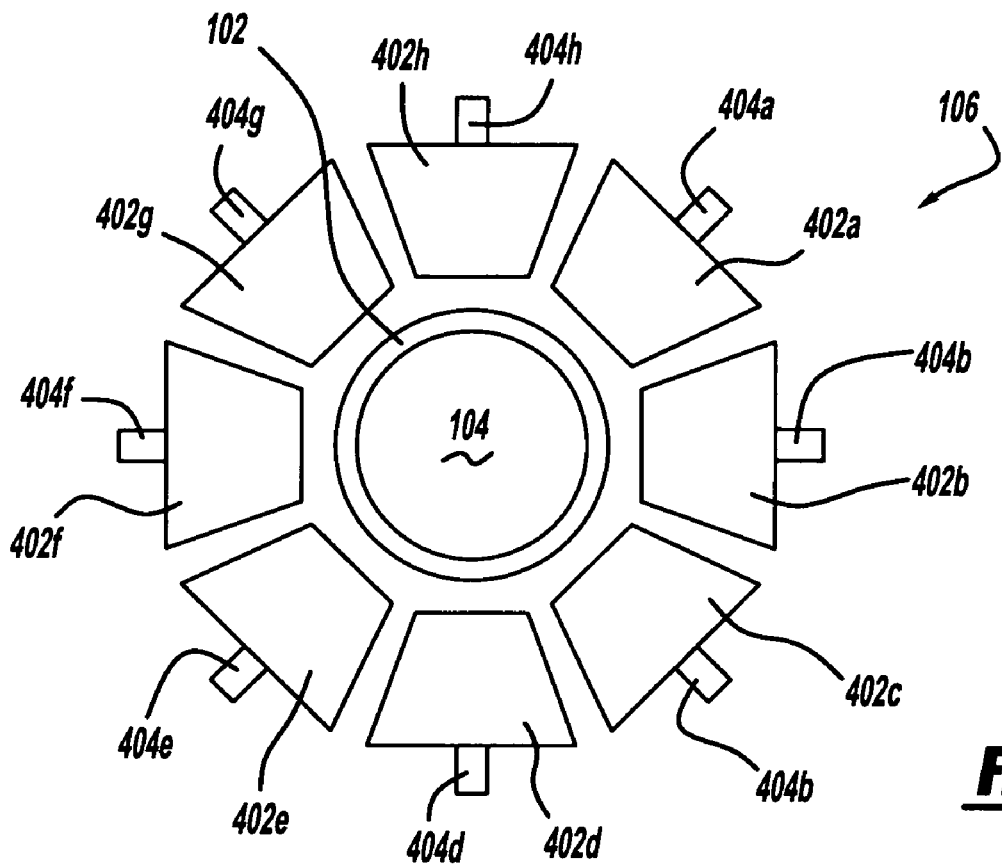
FIG. 4 is a side view of pertinent portions of a gauging station useful in accordance with the principles of the invention.

Compression of the support mat/catalytic substrate 100 is achieved using the apparatus depicted in FIG. 4. The support mat 102 and catalytic substrate 104 are put under pressure in a uniform radially inward direction using a plurality, for example, eight, segmented interface pads 402a-h each associated with a pressure measuring load cell 404a-h.

Figure 5:
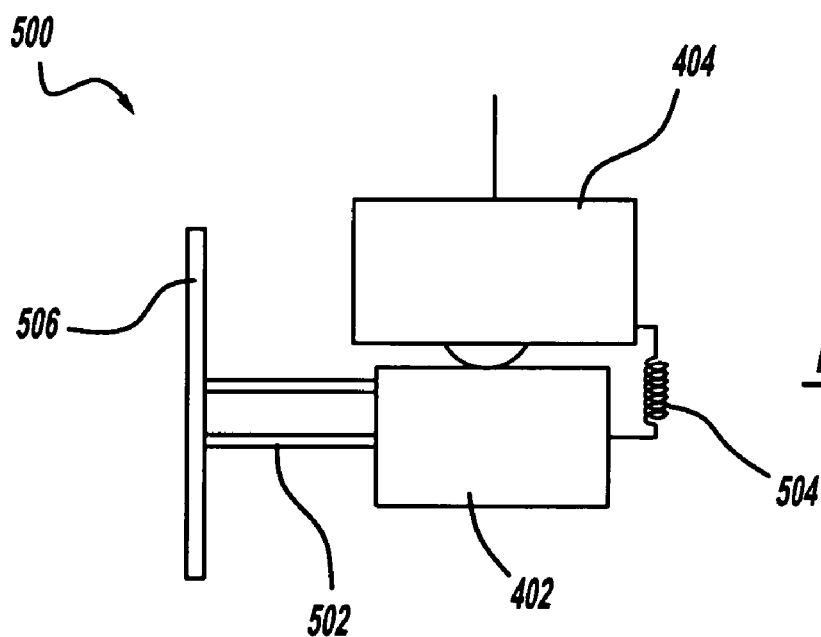
FIG. 5 sets forth details of a typical interface pad/load cell combination arrangement useful in the gauging station of FIG. 4.
Figure 6:
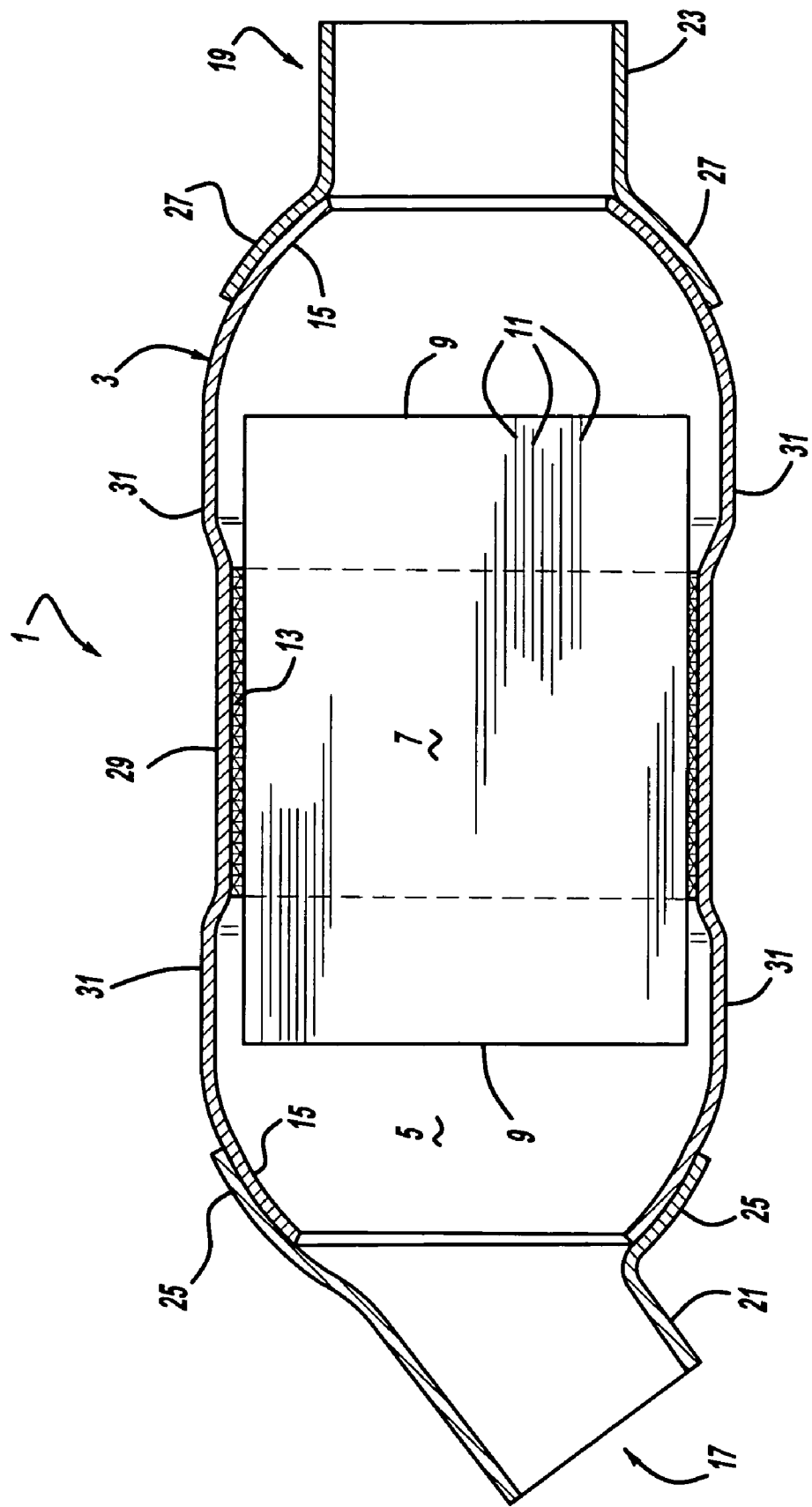
FIG. 6 is a side view of a catalytic converter which may be assembled in accordance with the principles of the invention.

To avoid torquing or pivoting conditions which lead to false pressure readings by the load cells, each load cell/interface pad assembly utilizes the stabilization arrangement set forth in FIG. 5. A leaf spring 502 couples each interface pad 402 to a frame support via a bracket 506. To further stabilize the arrangement, a coil spring 504 couples each load cell 404 to its respective interface pad 402. With this arrangement, each load cell is "squared" with its corresponding interface pad to eliminate the torquing condition which may lead to false pressure readings.

Hence, the invention provides for catalytic converter assembly and sizing using post calibration techniques to avoid sheer damage in the initial stuffing process. Through use of heuristic data, appropriate pressures and mat thicknesses under compression are determined which will yield gap bulk densities falling within a preselected acceptable range. It is believed that no further testing of the converter for appropriate gap bulk density will be required when the converter has been assembled in accordance with the invention described herein.

The invention has been described with respect to a detailed description of an exemplary embodiment which is given for the sake of example only.

What is claimed is:

1. Apparatus for applying uniform radially inwardly directed pressure on a compressible support mat surrounding a substrate for an exhaust treatment device, the apparatus comprising:

a plurality of interface pads defining a space adapted for receipt of the support mat and substrate;

each pad associated with a pressure measuring load cell and movable radially inwardly against the support mat, wherein each interface pad is coupled to a support frame via a leaf spring.

2. The apparatus of claim 1 wherein each interface pad is coupled to its associated load cell via a coil spring.

3. The apparatus of claim 1 wherein the exhaust treatment device comprises a catalytic converter, the substrate comprises a catalyst-containing member and the support mat comprises a shock-absorbent, resilient, insulative support.

\* \* \* \* \*